US012712917B2

(12) United States Patent
Lahiri et al.

(10) Patent No.: US 12,712,917 B2
(45) Date of Patent: Aug. 18, 2026

(54) ENFORCING SECURITY POLICIES AND ATTESTATION ON EDGE INFRASTRUCTURE

(71) Applicant: Microsoft Technology Licensing, LLC, Redmond, WA (US)

(72) Inventors: Shayak Lahiri, Redmond, WA (US); Narasimhan Ramasubramanian, Redmond, WA (US); Simon Karl Lars Jaeger, Redmond, WA (US); Kritika Kishore Prasad, REdmond, WA (US); Adrian F. Teran, Redmond, WA (US); Marius C. Niculescu, Redmond, WA (US); Jagannathan Deepak Manohar, Redmond, WA (US); Peter J. Kaufman, Redmond, WA (US); Preston D. Adam, Redmond, WA (US); Balaji Balasubramanyan, Redmond, WA (US); Seth C. Beinhart, Redmond, WA (US); Matthew Reynolds, Redmond, WA (US); Sumit Lahiri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 18/626,555

(22) Filed: Apr. 4, 2024

(65) Prior Publication Data

US 2024/0250997 A1 Jul. 25, 2024

Related U.S. Application Data

(60) Provisional application No. 63/598,382, filed on Nov. 13, 2023.

(51) Int. Cl.
*H04L 9/40* (2022.01)
*H04W 74/0833* (2024.01)
*H04W 74/0836* (2024.01)

(52) U.S. Cl.
CPC ......... *H04L 63/20* (2013.01); *H04W 74/0833* (2013.01); *H04W 74/0836* (2024.01)

(58) Field of Classification Search
CPC ....................................................... H04L 63/20
(Continued)

(56) References Cited

U.S. PATENT DOCUMENTS 11,263,048 B1 3/2022 Wilkes et al.
11,489,823 B2 * 11/2022 Ward ...................... H04L 63/08
(Continued)

OTHER PUBLICATIONS

International Search Report and Written Opinion received for PCT Application No. PCT/US2024/051683, Feb. 26, 2025, 11 pages.
(Continued)

*Primary Examiner* — Anthony D Brown

(57) ABSTRACT

Examples of the present disclosure describe systems and methods for. In some examples, a software agent collects data from a node, such as logs or monitoring information, and provides the data to a controller. The controller assesses the attestation state and the configuration drift of the node. In some examples, the controller applies a taint to the node, which may indicate a condition or constraint on the node. A scheduler manages the workloads on the node based on the attestation state, the configuration drift, and in some examples, the taint of the node. The scheduler decides whether to schedule a workload to the node, evict a workload from the node, or keep a workload on the node depending on the attestation state and configuration drift of the node, for example, whether the workload has a toleration for the taint of the node.

20 Claims, 3 Drawing Sheets

(58) Field of Classification Search
USPC .............................................................. 726/1
See application file for complete search history.

(56) References Cited

U.S. PATENT DOCUMENTS

| | | | |
|---|---|---|---|
| 11,586,738 B2 * | 2/2023 | Robison .................. | G06F 21/57 |
| 12,175,273 B2 * | 12/2024 | Nagasundaram ..... | G06F 9/5027 |
| 2019/0230002 A1 | 7/2019 | Bernat et al. | |
| 2020/0142753 A1 * | 5/2020 | Harwood .............. | G06F 9/4856 |
| 2020/0192692 A1 | 6/2020 | Ghag et al. | |
| 2021/0184928 A1 | 6/2021 | Lal et al. | |
| 2021/0281553 A1 * | 9/2021 | Ward ...................... | G06F 21/53 |
| 2022/0070178 A1 | 3/2022 | Lee | |
| 2022/0114023 A1 | 4/2022 | Choksi et al. | |
| 2022/0116445 A1 * | 4/2022 | Filippou ............. | H04L 41/0806 |
| 2022/0179958 A1 * | 6/2022 | Robison .................. | G06F 21/57 |
| 2022/0291965 A1 | 9/2022 | Sudhakaran et al. | |
| 2023/0115795 A1 | 4/2023 | Manickam et al. | |
| 2023/0195485 A1 * | 6/2023 | Nagasundaram ..... | G06F 9/5077 718/1 |
| 2023/0342478 A1 | 10/2023 | Ranganathan | |

OTHER PUBLICATIONS

Goldenring, et al., “Project-Akri”, Retrieved From: https://github.com/project-akri/akri, Nov. 17, 2023, 4 Pages.
“DaemonSet”, Retrieved From: https://kubernetes.io/docs/concepts/workloads/controllers/daemonset/, Retrieved on: Aug. 18, 2023, 6 Pages.
“Kubernetes”, Retrieved From: https://github.com/kubernetes/kubernetes/commit/ee4dd1412de7ac3ea2a7fb42353e0366fa54d9eb, Retrieved on: Aug. 18, 2023, 3 Pages.
“SPIRE Concepts”, Retrieved From: https://spiffe.io/docs/latest/spire-about/spire-concepts/, Retrieved on: Aug. 18, 2023, 11 Pages.
“Taints and Tolerations”, Retrieved From: https://kubernetes.io/docs/concepts/scheduling-eviction/taint-and-toleration/, Retrieved on: Aug. 18, 2023, 6 Pages.
Goedtel, et al., “Support Policies for Azure Kubernetes Service”, Retrieved From: https://learn.microsoft.com/en-us/azure/aks/support-policies#shared-responsibility, Aug. 28, 2023, 8 Pages.
Palma, et al., “Customize Node Configuration for Azure Kubernetes Service (AKS) Node Pools”, Retrieved From: https://learn.microsoft.com/en-us/azure/aks/custom-node-configuration?tabs=linux-node-pools, Apr. 25, 2023, 13 Pages.
/A.D.B/International Preliminary Report on Patentability received for PCT Application No. PCT/US2024/051683, (Ms# 413888-PCT01) mailed on May 28, 2026, 06 pages.

* cited by examiner

ENFORCING SECURITY POLICIES AND ATTESTATION ON EDGE INFRASTRUCTURE

CROSS-REFERENCE TO RELATED APPLICATIONS

This application claims the benefit of U.S. Provisional Application No. 63/598,382 filed Nov. 13, 2023, entitled "Enforcing Attestation On Edge Infrastructure," which is incorporated herein by reference in its entirety.

BACKGROUND

Edge computing enables data processing and analysis near the source of the data, rather than relying on centralized cloud servers. Edge computing offers benefits such as reduced latency, improved bandwidth efficiency, enhanced privacy, and increased resilience. Edge applications (e.g., containerized applications) running on edge platforms must be secure and follow certain rules to protect the edge platforms and associated data.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present disclosure relates to systems and methods for enforcing security policies and attestation on edge infrastructure. An example system includes a node (e.g., a virtual machine) and a node service, which is software that deploys a software agent on the node. The software agent accesses event data for the node. A controller determines an attestation state of the node by comparing the event data to predefined values for the event data. The controller applies a taint to the node based on the attestation state. The controller manages workloads associated with the node based on the taint. In some examples, the controller evicts a currently executing workload from the node based on the currently executing workload being incompatible with the taint. In other examples, the controller schedules a new workload to execute on the node based on the new workload being compatible with the taint. Other systems and methods may include one or more similar aspects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
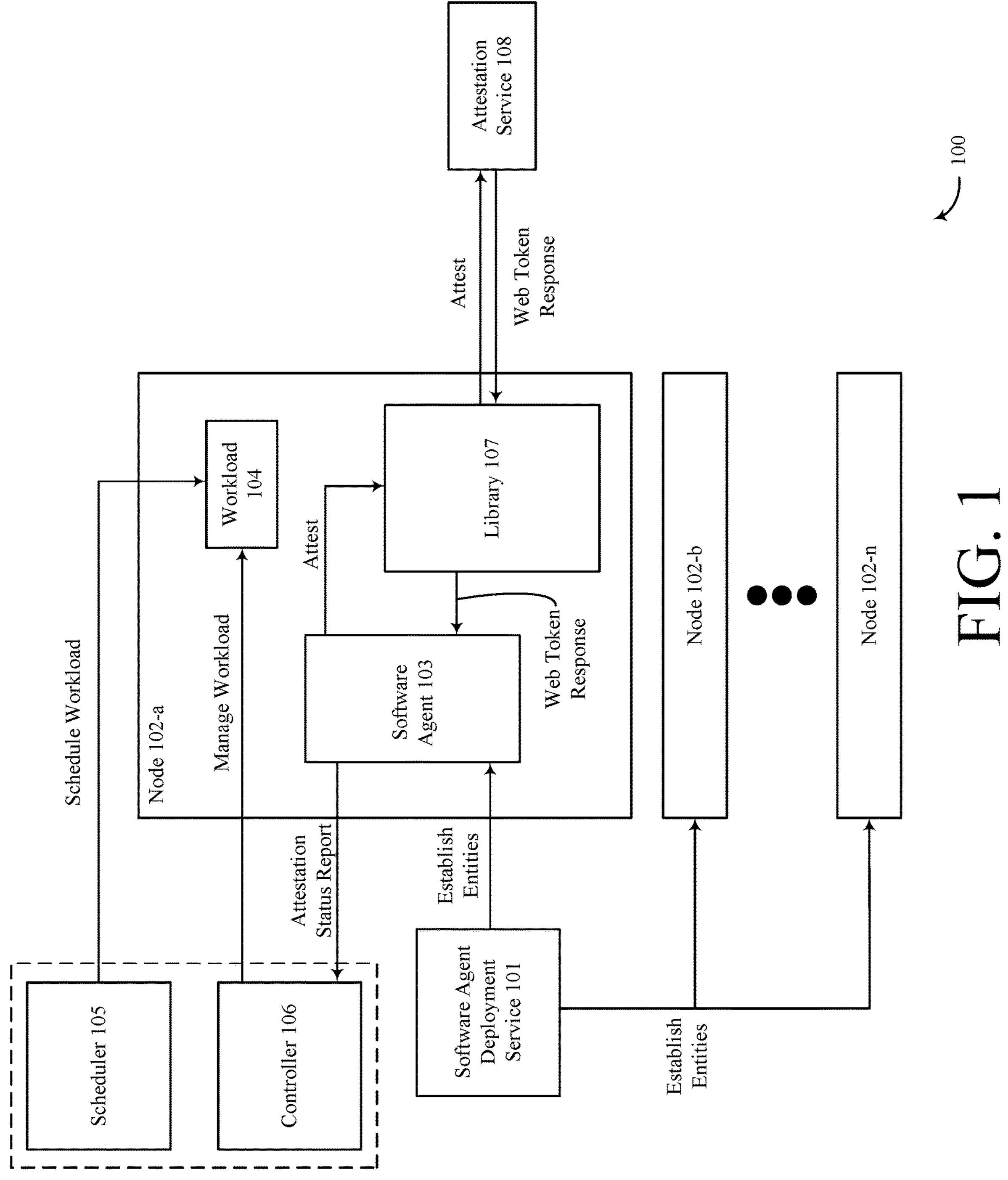
FIG. 1 illustrates an example system diagram that implements the enforcement of security policies and attestation on edge infrastructure in accordance with examples described herein.

In accordance with examples described herein, the present application provides systems and methods for enforcing security policies and attestation on edge infrastructure.

As described previously, edge computing enables data processing and analysis near the source of the data, rather than relying on centralized cloud servers. Edge computing offers benefits such as reduced latency, improved bandwidth efficiency, enhanced privacy, and increased resilience. Edge applications (e.g., containerized edge applications) running on edge platforms (e.g., edge devices) must be secure and follow certain rules to protect the edge platforms and associated data. However, edge computing poses significant challenges for ensuring the security and compliance of containerized applications that run on edge platforms. Containerized applications or "workloads" are applications that are executed in a container. A container refers to a software package comprising software code that is packaged in a way that makes the software code easy to move and run on different computing platforms (e.g., edge platforms, fog platforms, cloud computing platforms). Such workloads running on edge platforms should adhere to zero trust principles and support periodic disconnections or air-gapped scenarios, where the edge platforms are not always connected to the cloud or the internet. To offer a secure environment for workloads, hosts and nodes should be secure by different entities (e.g., cloud providers, edge device manufacturers, software deployers, third-party security services) which are part of the lifecycle of the pods executing. A pod refers to a group of one or more workloads having shared storage and/or network resources. Beneficially, solutions should ensure that the trust is chained so that there is not a gap in the chain that will allow subversion of the security of the nodes. As such, there is currently a need for a secure and verifiable environment for workloads running on edge platforms that are periodically disconnected from the cloud or the internet, and that are orchestrated by an engine that can integrate with the edge platform's security and compliance policies. An example system evaluates the security of nodes on an edge platform locally on the edge platform by collecting information and managing node workloads based on the collected information, which allows for security standards to be maintained even when devices are network disconnected or have high latency.

In accordance with examples described herein, an example system may implement conditional execution by evaluating attestation and configuration drift of a node on an edge platform. This evaluation enforces admissibility and execution-continuity for containerized applications and enables managing workload scheduling on the node based on the attestation and configuration drift. Admissibility refers to scheduling workloads or pods including the workloads on nodes. Execution-continuity refers to selectively evicting a workload or a pod including the workload from a node when the pod or workload does not have a toleration for a particular taint of a node. Such a strategy ensures that workloads meeting the security baseline and compliance policies are scheduled, which maintains operational integrity even in air-gapped or high-latency scenarios. The system begins this process by provisioning hosts, where security is a priority, including making attested checks verified by security services. For example, an example system may evaluate attestation and configuration drift of a node on an edge platform and manage workload scheduling on the node based on the attestation and configuration drift of the node. Following this, virtual machines (VMs) are set up to host workload pods, with security ensured by passing attestation and applying security baselines and policies. The configuration drift of a node refers to the amount that the current configuration settings of a node deviate from the previous or desired configuration settings of the node. The previous or desired configuration settings of the node may define a security baseline for the node, attestation policies, or other policies. The amount of deviation between the current configuration settings of a node and previous or desired configuration settings of a node may be used to determine whether a node is misconfigured or is a potential security breach has occurred. The configuration drift may be expressed as a percentage, a score, or a list of discrepancies.

The example system includes a node and a node service, which is software that deploys a software agent on the node. For instance, in a smart factory setting, a software manager service (the node service) deploys on an industrial PC (the node) a software agent that controls robotic arms on an assembly line. A node may represent a VM or another type of virtualized environment running on a computing device (e.g., an edge platform, an edge device, a cloud device, a personal computer (PC)). Pods are deployed on these VMs, with the security state of the VMs now a factor in scheduling decisions. The software agent collects data such as system logs and monitoring information. These logs help track the node's activities and identify any unusual behavior that could indicate a security issue. The monitoring information provides real-time insights into the node's performance, allowing for proactive management of resources and quick response to potential problems. Once the data is collected, the software agent sends the data to the controller, which uses the data to assess the node's attestation state and configuration drift. The controller then makes informed decisions about workload management on the node, ensuring that secure and compliant workloads are executed. For example, the controller assesses the attestation state and the configuration drift of the node. The attestation state is a measure of a node's trustworthiness or security status, verified through a process that checks if the node's hardware and software configurations are as expected and are free from tampering. Configuration drift refers to the divergence of a node's current settings from its established baseline or desired configuration, which can indicate potential misconfigurations or security breaches. The proposed technology introduces a mechanism where attestation and configuration drift become signals that directly influence scheduling decisions.

In some examples, the attestation state may be assessed or measured in a trusted execution environment (TEE) during startup and/or during runtime. In some examples, the controller applies a taint to the node, which may indicate a condition or constraint on the node (e.g., resource limitations, maintenance requirements, security compliance issues, geographical restrictions, network isolation), to inform scheduling decisions within the system. Resource limitations refer to a node's lack of sufficient computational resources (e.g., CPU, memory, or storage), which could impede the node's ability to host additional workloads. Maintenance requirements imply that the node is under maintenance or updates, signaling that the node should not schedule new workloads until the maintenance is complete. Security compliance issues indicate a node's failure to meet security standards, which could include lapses in encryption or outdated security software. Geographical restrictions are constraints based on legal or policy requirements that mandate data processing within certain geographic boundaries. Network isolation is a condition in which a node is separated from the network due to vulnerabilities or security breaches, necessitating careful workload placement to ensure system integrity.

The system includes a scheduler, which is a software component that operates based on a set of algorithms and policies to manage the workloads on the node. The scheduler takes into account the attestation state, which verifies the node's trustworthiness, and the configuration drift, which monitors any deviations from the desired settings. Additionally, the scheduler evaluates any taints applied to the node, representing various conditions or constraints that might affect workload placement. Based on these factors, the scheduler makes decisions to either schedule a new workload on the node, evict an existing workload, or maintain the current workloads, ensuring that each action aligns with the node's security posture and operational requirements. Nodes that are determined to be unhealthy are not used for scheduling, and nodes that deviate from security standards may have workloads evicted or prevented from scheduling based on various policies. Some taints may prevent new workloads from being scheduled on a tainted node if the new workload does not have a toleration for the taint. The toleration for a taint refers to a property of a workload that allows the workload to be scheduled on a node despite the presence of specific taints. The toleration identifies whether the workload is equipped to handle or ignore the conditions or constraints indicated by the taint, thereby ensuring that the workload can operate effectively on the tainted node without compromising the system's integrity or security. Additionally, some taints may cause the eviction of workloads on a tainted node if the executing workload does not have a toleration for the taint.

In some examples, the software agent communicates with an attestation service to verify the attestation state of the node and remediate the node based on the attestation state and the configuration drift of the node (e.g., provide instructions to remediate the node or initiate the remediation process). Remediating a node refers to the process of bringing a node back into compliance with the desired security and configuration standards for the node. This can involve actions such as applying security patches, adjusting settings to match the baseline configuration, or restarting the node to clear any transient issues. For example, if an attestation service detects that a node's software is not up to date with the latest security patches, the software agent on the node would initiate the remediation process. Initiating the remediation process could involve automatically downloading and installing the latest security patches to ensure the node meets the required security standards, thus resolving any vulnerabilities and minimizing the risk of security breaches. After remediation, the node's attestation state would reflect that the node is now in compliance and is eligible to resume hosting workloads. Other systems and methods may include one or more similar aspects.

Advantageously, the present invention provides a robust solution to enhance the security of workload execution environments. By integrating advanced attestation mechanisms and configuration drift analysis, the system empowers the scheduler to make informed decisions based on real-time security assessments of nodes. This innovative approach ensures that only nodes meeting stringent security requirements are utilized for scheduling and executing workloads, thereby significantly reducing the risk of security breaches. Furthermore, the system's ability to detect nodes that have experienced configuration drift or that cannot be attested and to apply appropriate taints revolutionizes workload management. In instances of non-compliance (e.g., a node has experienced configuration drift or cannot be attested), the system facilitates swift remediation by allowing nodes to be brought back into alignment with established security standards. This proactive stance on security compliance not only fortifies the system against potential threats, but also streamlines the management of workloads to ensure operational continuity and resilience of the system. In essence, the disclosed technology creates a self-regulating, secure execution environment that adapts to evolving security landscapes. The result is a significant technological advancement over existing solutions by providing a more secure, efficient, and compliant operational framework for containerized applications.

FIG. 1 illustrates a system that implements the enforcement of security policies and attestation on edge infrastructure. System 100, as presented, includes a combination of interdependent components that interact to form an integrated whole. Components of system 100 include hardware components or software components (e.g., application programming interfaces (APIs), modules, runtime libraries) implemented on and/or executed by hardware components of system 100. In some examples, components of system 100 are distributed across multiple processing devices or computing systems.

System 100 includes software agent deployment service 101, nodes 102-*a*-*n* (collectively "nodes 102"), software agent 103, workload 104, scheduler 105, controller 106, library 107, and attestation service 108. The scale and structure of devices and environments discussed herein may vary and may include additional or fewer components than those described in FIG. 1 and subsequent figures. For example, at least a portion of the functionality of scheduler 105 and/or controller 106 may be included within nodes 102, whereas at least a portion of the functionality or components of library 107 may be implemented outside of nodes 102. Further, although only node 102-*a* is depicted in FIG. 1 as comprising software agent 103, workload 104, and library 107, it is contemplated that each of node 102-*b* through node 102-*n* also comprises one or more of software agent 103, workload 104, and library 107. In some examples, scheduler 105 and controller 106 may be deployed on a same component.

Software agent deployment service 101 is a software service that manages the distribution of software agents 103 to nodes 102. Software agent deployment service 101 may be implemented as a daemon (e.g., a background service that is non-interactive to users) or as an active service (e.g., a foreground service that may or may not be interactive to users). In examples, as part of an initialization process for each of nodes 102, software agent deployment service 101 provides one or more software agents 103 and/or a set of security policies to each of nodes 102. The security policies may include rules and policies applicable to nodes 102, such as user and system access settings, firewall rules, antivirus settings, data encryption options, resource usage settings and thresholds, data collection and storage rules, and the like. The security policies may also include attestation policies and/or commands related to, for example, verifying the integrity of software code of nodes 102 and verifying nodes 102 booted securely and correctly. Alternatively, software agent deployment service 101 (or another component of system 100) provides the attestation policies and/or commands to nodes 102 separately from the security policies.

The security policies may be configured by a user (e.g., a developer or an administrator) and stored on software agent deployment service 101 (or in a data store accessible to software agent deployment service 101) as, for example, a custom resource definition (CRD). In some examples, the security policies include a default set of policies that are applied to each new software agent 103 that is deployed to nodes 102. In other examples, the security policies may vary for one or more nodes. For instance, each of nodes 102 may be provided a custom set of security policies based on attributes or preferences of a user, attributes of a node 102, and/or intended usage of a node 102. In at least one example, software agent deployment service 101 provides updated security policies to nodes 102 at some point after the initialization process for each of nodes 102. For instance, software agent deployment service 101 may provide updated security policies periodically (e.g., hourly, daily, weekly) or in response to a specified event (e.g., a user request to provide updated security policies or the deployment of a new node 102 or software agent 103).

Nodes 102 includes virtualizations or emulations of computer systems that run on a physical computer with a separate operating system and computing resources. Nodes 102 provide functionality of the physical computer through software used to execute and deploy services and applications. Nodes 102 may be trusted or confidential nodes that ensure that data and applications implemented within the nodes remains private and/or encrypted. In examples, one or more of nodes 102 are deployed on host computing devices and are responsible for running workloads 104. Workload 104 is associated with an amount of work to be executed by or demand placed on compute resources of a computing system, such as nodes 102. For instance, workload 104 may be associated with one or more discrete tasks, which may each be associated with one or more central processing unit (CPU) threads of nodes 102.

Software agent 103 is an agent software service or a privileged pod deployed by software agent deployment service 101. A privileged pod refers to a pod having an enhanced or elevated set of privileges compared to unprivileged pods. For instance, a privileged pod may be permitted to access a host computing device's resources and kernel capabilities. In some examples, a pod may comprise a unique IP address, persistent storage volumes, and/or configuration information that determines how a container should run.

Software agent 103 manages node 102-*a* by ensuring node 102-*a* is running correctly. For example, software agent 103 collects data from node 102-*a* and/or the host device implementing node 102-*a*, such as logs (e.g., Trusted Platform Module (TPM) event log files), monitoring information (e.g., Platform Configuration Register (PCR) events and configuration drift data), scenario definition measurements, or other metrics. Software agent 103 communicates with library 107 and/or attestation service 108 to verify the attestation state of node 102-*a*. The attestation state indicates whether node 102-*a* is running correctly and securely or has been tampered with or otherwise compromised. The attestation state may be expressed as a Boolean value (e.g., true or false), a numerical value (e.g., 0 or 1), or a categorical value (e.g., pass or fail, secure or unsecure/vulnerable, action needed or no action needed).

In examples, software agent 103 obtains a web token response from attestation service 108 in response to attestation service 108 performing verification of the attestation state of node 102-*a*. The web token response is a data structure that includes the attestation state and other information, such as the configuration drift, of node 102-*a*. The web token response may be formatted as a JSON Web Token (JWT), a Simple Web Token (SWT), or another standard or custom format. Software agent 103 provides an attestation status report to controller 106 based on the web token response. The attestation status report may include the attestation state, the configuration drift, and a security score that is indicative of the overall health and/or security of node 102-*a*. The security score may be represented as a label (e.g., Healthy, Unhealthy, Partially Healthy), a numerical value (e.g., 85 on a scale of 0 to 100), or any other type of value. In examples, the security score is based on the attestation state and/or configuration drift. For instance, an attestation value that indicates that the attestation process performed by with library 107 and/or attestation service 108 was successful (e.g., "true," "1," "pass") may result in a security score of "Healthy," whereas an attestation value that indicates that the attestation process was unsuccessful (e.g., "false," "0," "fail") may result in a security score of "Unhealthy."

Scheduler 105 manages workload 104 on node 102-*a*. Managing workload 104 comprises assigning workload 104 to or removing ("evicting") workload 104 from software agent 103 and/or one or more other pods (e.g., unprivileged pods) of nodes 102 based on taints and/or tolerations associated with software agent 103 and/or the other pods. A taint refers to a property of a node 102 that specifies a preference (or a requirement) to prevent pods associated with particular tolerations from being assigned to that node 102 (e.g., an operational constraint for the node 102). A pod may be assigned one or more taints. A toleration is a property of a pod that allows it to be scheduled on a node with specific taints, indicating that the pod can operate under the conditions the taints represent. A toleration that is compatible with a taint enables a pod to be scheduled to a particular node associated with the taint. As one example, nodes 102 associated with a "NoExecute" taint will cause scheduler 105 to immediately evict any running pods from those nodes 102 that do not have a toleration for the "NoExecute" taint. The "NoExecute" taint may be suitable for workloads 104 that are sensitive or high risk and need an elevated level of security and isolation. As another example, nodes 102 associated with a "NoSchedule" taint will cause scheduler 105 to allow currently running pods that do not have a toleration for the "NoSchedule" taint to complete, but cause scheduler 105 to prevent additional pods that do not have a toleration for the "NoSchedule" taint to be scheduled to the nodes 102. The "NoSchedule" taint may be suitable for workloads 104 that are not (or are less) sensitive or low risk, and that balance security with business continuity and availability. In examples, a user (e.g., a developer or an administrator) assigns taints to nodes 102 and/or assigns tolerances to pods of nodes 102. For instance, a user may assign taints and tolerances prior to the initialization process for each of nodes 102. Controller 106 or the user, or another component, may update the taints and/or tolerances at some point after the initialization process (e.g., while nodes 102 are running or while nodes are stopped). Taints may be updated, changed, or adjusted based on changed attestation states and/or configuration drifts of a corresponding node 102.

Controller 106 is a hardware device or a software program that manages or directs the flow of data between two components. Controller 106 evaluates the attestation state and/or the configuration drift of node 102-*a* based on the web token response from attestation service 108. As one example, controller 106 evaluates the value of the attestation state in the web token response by comparing the value of the attestation state to one or more predefined values or thresholds. For instance, the value of the attestation state may be compared to a data structure (e.g., a lookup table, a file, a data array) comprising one or more values that each indicate the attestation of node 102-*a* was successful (e.g., "true," "1," "pass"). In another instance, the value of the attestation state is compared to a threshold value that delineates between successful and unsuccessful attestation of node 102-*a*. As another example, controller 106 evaluates the deviation between a previous set of configuration settings for node 102-*a* (e.g., configuration settings at boot time or at a previous snapshot or check point) and the current state of the configuration settings for node 102-*a*. For instance, the parameter values for previous or initial user access configuration settings (e.g., specifying which users have access to node 102-*a* and which resources of system 100 can be accessed by each user via node 102-*a*) are compared to the parameter values for the current user access configuration settings.

In some examples, controller 106 assigns a security score to node 102-*a* based on the attestation state and/or configuration drift of node 102-*a*. In other examples, software agent 103 assigns the security score to node 102-*a* and provides the security score to controller 106. In such examples, an attestation value that indicates that the attestation of node 102-*a* was successful may cause a security score of "Healthy" to be assigned to node 102-*a*, whereas an attestation value that indicates that the attestation of node 102-*a* was unsuccessful may cause a security score of "Unhealthy" to be assigned to node 102-*a*. Alternatively, a configuration drift indicating a current configuration setting does not deviate (or deviates within an acceptable threshold) from a previous configuration setting (e.g., predefined security configuration) may cause a security score of "Healthy" to be assigned to node 102-*a*, whereas a configuration drift indicating a current configuration setting deviates (beyond an acceptable threshold) from a previous configuration setting may cause a security score of "Unhealthy" to be assigned to node 102-*a*.

Controller 106 may additionally or alternatively apply a taint to node 102-*a* based on the security score (and/or the attestation state or the configuration drift) for node 102-*a*. For example, a security score indicating that node 102-*a* is healthy and/or secure (e.g., due to a current configuration setting not deviating from a previous configuration setting beyond a threshold) may cause controller 106 to apply a permissive taint (e.g., a taint indicating no restrictions in scheduling pods to the node) or to not apply a taint to node 102-*a*. Conversely, a security score indicating that node 102-*a* is unhealthy and/or unsecure (e.g., due to a current configuration setting deviating from a previous configuration setting beyond a threshold) may cause controller 106 to apply a restrictive taint (e.g., a "NoSchedule" taint or a "NoExecute" taint) to node 102-*a*.

In some examples, controller 106 attempts to remediate node 102-*a* when node 102-*a* is determined to have a security score indicating that node 102-*a* is unhealthy and/or unsecure. For instance, in response to determining that node 102-*a* is no longer compliant with one or more security policies previously provided to node 102-*a* (e.g., as part of the initialization process for node 102-*a*), controller 106 may attempt to adjust one or more settings or parameters of node 102-*a* to put node 102-*a* back into compliance with the security policies. Adjusting settings or parameters may include initiating software updates, altering configuration settings (e.g., disabling unnecessary services or ports, enforcing stronger password policies, or updating firewall rules), adjusting user permissions and roles to ensure that only authorized personnel have access to sensitive functions and data, changing network configurations to isolate node 102-*a* from certain parts of the network or to implement additional monitoring, modifying the allocation of computational resources of the system or network (e.g., CPU, memory, storage, or bandwidth) to meet the requirements of security tools or processes, and/or updating or enforcing new security policies that dictate how the node should operate securely. Alternatively, controller 106 may retrieve and/or apply an updated (or original) version of the security policies to node 102-*a*. In another instance, in response to determining that access to or data within node 102-*a* has been compromised, controller 106 may cause software agent 103 and/or node 102-*a* to restart or to be removed and reinstalled. In such instances, restarting or reinstalling the software agent 103 and/or node 102-*a* may cause software agent 103 and/or node 102-*a* to begin executing in a safe mode (e.g., a diagnostic mode that provides access to a limited set of files, services, and functionality). Responsive to remediation, controller 106 may remove one or more taints (e.g., taints corresponding to the configuration drift) associated with the remediation (e.g., associated with the one or more security policies), allowing for the execution of workloads without a toleration for the one or more taints.

Library 107 is a software library comprising software code that is used by software agent 103 to verify node 102-*a* booted correctly and is currently running correctly. In examples, library 107 is a platform attestation library that provides platform-specific functions for attestation. For instance, the library 107 may comprise a first software function that provides an authenticated statement about the trustworthiness of nodes 102 implemented in a first computing platform (e.g., Microsoft Windows) and a second software function that provides an authenticated statement about the trustworthiness of nodes 102 implemented in a second computing platform (e.g., Linux). In some examples, library 107 provides functions for remediation of node 102-*a*. Such functions enable, for example, restarting and/or reinstalling software agent 103 and/or node 102-*a*, executing troubleshooting procedures, retrieving and applying an updated (or original) version of security policies to node 102-*a*, suspending functions on node 102-*a*, throttling workloads processed by node 102-*a*, notifying one or more users of a security score indicating that node 102-*a* is unhealthy and/or unsecure, evicting pods from node 102-*a*, and migrating pods from node 102-*a* to other nodes 102.

Attestation service 108 is an attestation authority that verifies the attestation state of node 102-*a* based on the data collected by software agent 103 (e.g., logs, monitoring information, other metrics). For example, attestation service 108 may evaluate one or more TPM event log files to determine whether node 102*c*-*a* booted correctly. The determination comprises comparing the values in PCR entries (e.g., storing configuration data and system measurements) stored in the TPM event log files to known good values. If the values in the PCR entries match the known good values, node 102-*a* is considered to have booted correctly and may be considered to be trusted. If the values in the PCR entries do not match the known good values, node 102-*a* is considered to have not booted correctly and may be considered to be compromised or unsecure. As another example, attestation service 108 may evaluate configuration drift data to determine whether current configuration settings on node 102-*a* deviate from previous configuration settings on node 102-*a*. The determination comprises identifying whether the values in the current configuration settings exceed a threshold difference from the values in the previous configuration settings. Verifying the attestation state of node 102-*a* ensures that the data is protected from unauthorized access or tampering. Attestation service 108 provides the web token response to software agent 103 that includes the attestation state and/or other information (e.g., configuration drift).

Figure 2:
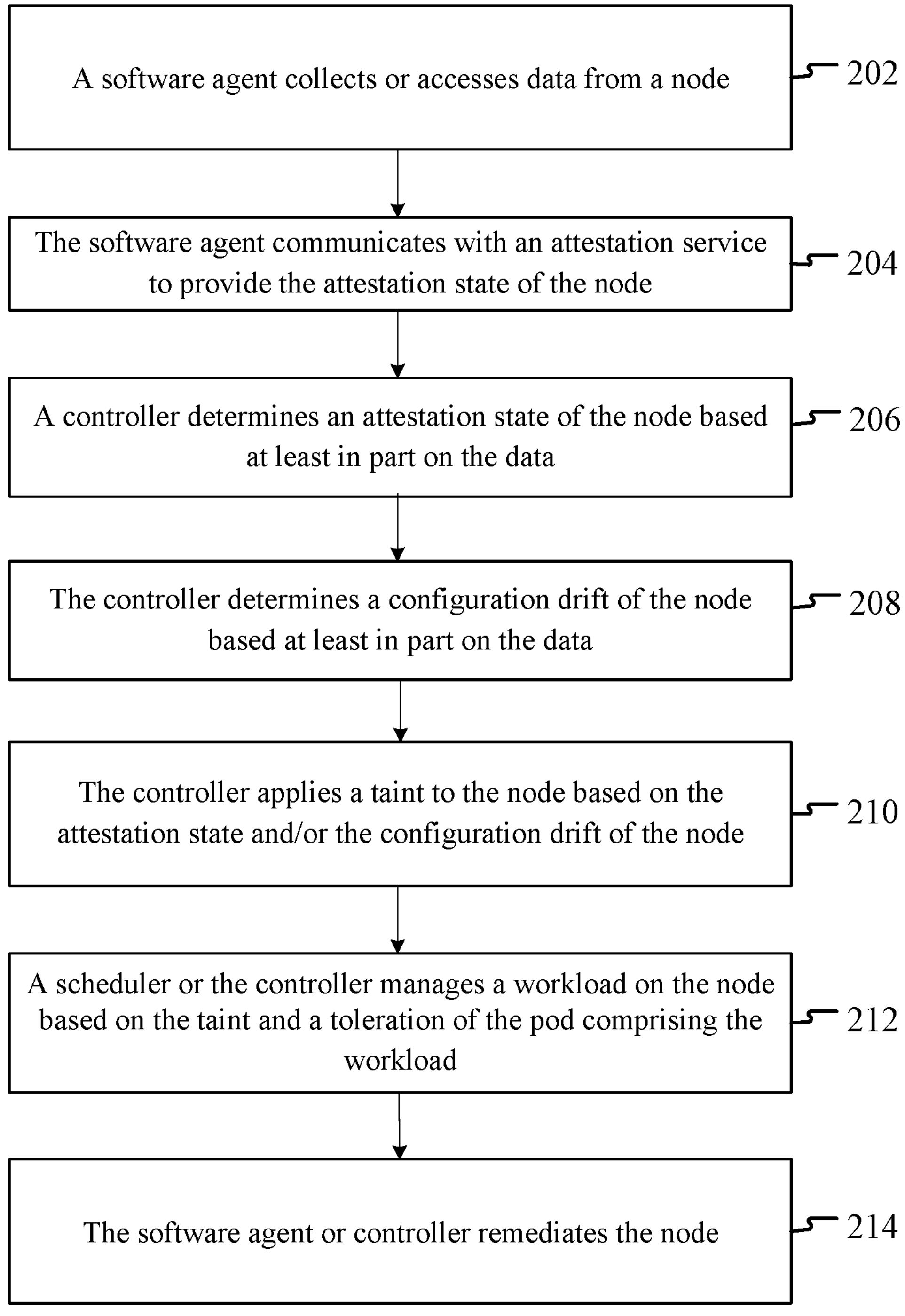
FIG. 2 illustrates a method flow for enforcing security policies and attestation on edge infrastructure in accordance with examples described herein.

FIG. 2 illustrates an example method for enforcing security policies and attestation on edge infrastructure. The method 200 may be performed by the systems described herein and/or the components of such systems. For instance, the method 200 may be performed by software agent deployment service 101, nodes 102, scheduler 105, controller 106, and/or attestation service 108 of FIG. 1.

At operation 202, software agent 103 collects or accesses data from node 102-*a*. Software agent 103 may be an agent service or a privileged pod deployed by software agent deployment service 101. Node 102-*a* may also comprise one or more unprivileged pods that are used to process workloads provided to node 102-*a* (e.g., workloads 104). The data may include one or more logs, monitoring information, or other metrics that indicate the state and performance of node 102-*a*.

At operation 204, software agent 103 communicates with attestation service 108 to provide the attestation state of node 102-*a*. The attestation state indicates whether node 102-*a* is running correctly and securely, and whether it has been tampered with or compromised. Software agent 103 may use library 107 to communicate with attestation service 108. In examples, attestation service 108 is an attestation authority that verifies the attestation state of node 102-*a* based on the data collected by software agent 103. Attestation service 108 provides a web token response to software agent 103 that includes the attestation state and other information (e.g., configuration drift) of node 102-*a*. In some examples, software agent 103 assigns a security score to node 102-*a* based on node 102-*a*'s attestation state and/or configuration drift and provides the security score to controller 106.

At operation 206, controller 106 determines an attestation state of node 102-*a* based at least in part on the web token response (e.g., based on the collected or accessed data). As one example, controller 106 evaluates the value of the attestation state in the web token response by comparing the value of the attestation state to one or more predefined values or thresholds. Based on the determination, controller 106 assigns a security score to node 102-*a*. The security score indicates the overall health and/or security of node 102-*a*. The security score may be represented as a label (e.g., Healthy, Unhealthy, Partially Healthy) or as a numerical value that is indicative of a label. For instance, a security score between 0 and 33 (inclusive) may indicate that node 102-*a* is "Unhealthy," a security score between 34 and 66 (inclusive) may indicate that node 102-*a* is "Partially Healthy," and a security score between 67 and 100 (inclusive) may indicate that node 102-*a* is "Healthy."

At operation 208, controller 106 determines a configuration drift of node 102-*a* based at least in part on the web token response (e.g., based on the collected or accessed data). For example, controller 106 evaluates the deviation between a previous set of configuration settings for node 102-*a* (e.g., configuration settings at boot time or at a previous snapshot or check point) and the current state of the configuration settings for node 102-*a*. Based on the determination, controller 106 assigns a security score to node 102-*a*. For instance, if the configuration drift of node 102-*a* is determined to be large (e.g., there is a large deviation between the current configuration settings and previous configuration settings), the security score assigned to node 102-*a* may indicate that node 102-*a* is unsecured or has a significantly reduced level of security. The security score indicates the overall health and/or security of node 102-*a*. The security score may be represented as a label (e.g., Healthy, Unhealthy, Partially Healthy) or as a numerical value that is indicative of a label. For instance, a security score between 0 and 33 (inclusive) may indicate that node 102-*a* is "Unhealthy," a security score between 34 and 66 (inclusive) may indicate that node 102-*a* is "Partially Healthy," and a security score between 67 and 100 (inclusive) may indicate that node 102-*a* is "Healthy."

At operation 210, controller 106 applies a taint to node 102-*a* based on the attestation state and/or configuration drift of node 102-*a*. In some examples, controller 106 applies the taint to node 102-*a* based on the security score of node 102-*a*. In examples, the taint is a property of node 102-*a* that specifies a preference (or a requirement) to prevent workloads associated with particular tolerations from being assigned to node 102-*a*. For instance, the taint may have a value of "NoExecute," which causes any running pods that do not have a toleration for the "NoExecute" taint to be evicted from node 102-*a*. Alternatively, the taint may have a value of "NoSchedule," which prevents any additional pods from being scheduled on node 102-*a* or a value of "PreferNoSchedule," which indicates a preference against allowing additional pods from being scheduled on node 102-*a*.

At operation 212, scheduler 105 or controller 106 manages a workload on node 102-*a* based on the taint of node 102-*a* and the toleration of the pod comprising the workload. Managing a workload comprises scheduling a pod comprising the workload to node 102-*a* or evicting a pod comprising the workload from node 102-*a*. In examples, a toleration is a property of a pod (e.g., a privileged pod or an unprivileged pod) that specifies the types of taints that are compatible with the toleration. Pods may comprise one or more tolerations. For instance, software agent 103 or an unprivileged pod may have a toleration for the "NoSchedule" taint and "PreferNoSchedule" taint. Accordingly, such pods may be scheduled to and may run workloads on nodes associated with the "NoSchedule" and/or "PreferNoSchedule" taints. Conversely, a pod that does not have a toleration for a particular taint (e.g., "NoExecute") may be evicted from a node associated with the particular taint.

At operation 214, software agent 103 or controller 106 remediates node 102-*a*. In some examples, remediation is performed based on the security score for node 102-*a* indicating that node 102-*a* is unhealthy and/or unsecure. For instance, the security score may be the label "Unhealthy." In other examples, remediation is performed based on the attestation state of node 102-*a* and/or the configuration drift of node 102-*a*. Examples of remediation include restarting and/or reinstalling software agent 103 and/or node 102-*a*, executing troubleshooting procedures, retrieving and applying an updated (or original) version of security policies to node 102-*a*, suspending functions on node 102-*a*, throttling workloads processed by node 102-*a*, notifying one or more users of a security score indicating that node 102-*a* is unhealthy and/or unsecure, evicting pods from node 102-*a*, and migrating pods from node 102-*a* to other nodes 102.

Figure 3:
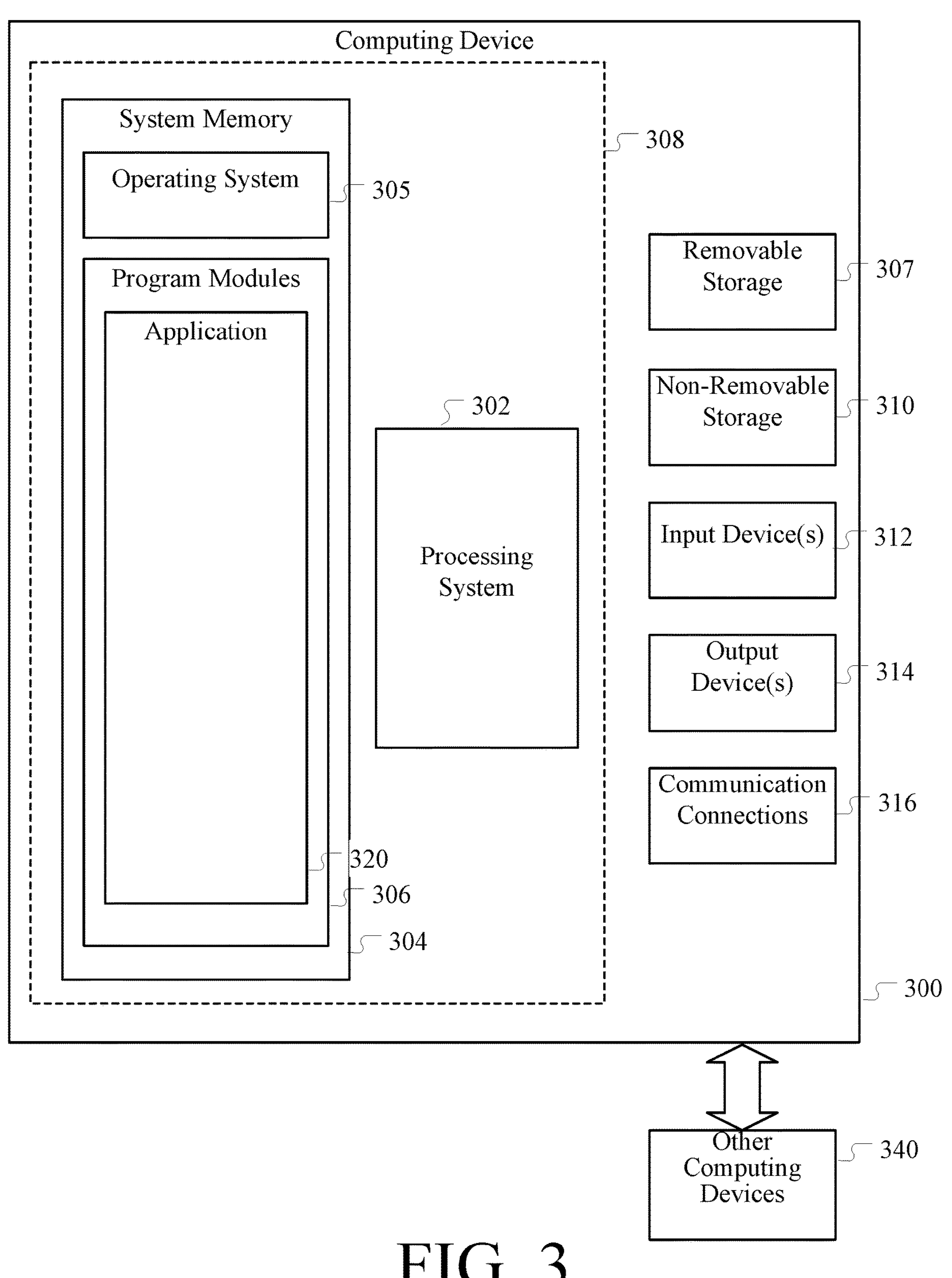
FIG. 3 illustrates a block diagram including physical components of a computing device in accordance with examples described herein.

FIG. 3 is a block diagram illustrating physical components (e.g., hardware) of a computing device 300 with which aspects of the disclosure may be practiced. The computing device components described below may be suitable for the computing devices and systems described above. In a basic configuration, the computing device 300 includes at least one processing system 302 comprising processing unit(s) and a system memory 304. Depending on the configuration and type of computing device, the system memory 304 may comprise volatile storage (e.g., random access memory (RAM)), non-volatile storage (e.g., read-only memory (ROM)), flash memory, or any combination of such memories.

The system memory 304 includes an operating system 305 and one or more program modules 306 suitable for running software application 320, such as one or more components supported by the systems described herein. The operating system 305, for example, may be suitable for controlling the operation of the computing device 300.

Furthermore, embodiments of the disclosure may be practiced in conjunction with a graphics library, other operating systems, or any other application program and is not limited to any particular application or system. This basic configuration is illustrated in FIG. 3 by those components within a dashed line 308. The computing device 300 may have additional features or functionality. For example, the computing device 300 may also include additional data storage devices (removable and/or non-removable) such as, for example, magnetic disks, or optical disks. Such additional storage is illustrated in FIG. 3 by a removable storage device 307 and a non-removable storage device 310.

As stated above, a number of program modules and data files may be stored in the system memory 304. While executing on the processing unit 302, the program modules 306 (e.g., application 320) may perform processes comprising the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 300 on the single integrated circuit (chip). Embodiments of the disclosure may also be practiced using other technologies capable of performing logical operations such as, for example, AND, OR, and NOT, comprising mechanical, optical, fluidic, and quantum technologies. In addition, embodiments of the disclosure may be practiced within a general-purpose computer or in any other circuits or systems.

The computing device 300 may also have one or more input device(s) 312 such as a keyboard, a mouse, a pen, a sound or voice input device, a touch or swipe input device, etc. The output device(s) 314 such as a display, speakers, a printer, etc. may also be included. The aforementioned devices are examples and others may be used. The computing device 300 may include one or more communication connections 316 allowing communications with other computing devices 340. Examples of suitable communication connections 316 include radio frequency (RF) transmitter, receiver, and/or transceiver circuitry; universal serial bus (USB), parallel, and/or serial ports.

Computing device 300, with processing system 302 and system memory 304, is equipped to support the deployment and operation of the node service and software agent. The operating system 305 facilitates the software agent's collection of data from a node, which may include the computing device 300 itself or another device. The program modules 306 may assess and manage the attestation state and configuration drift of the node. The scheduler, as part of program modules 306 in some examples, may utilize the attestation state, configuration drift, and/or any taints applied to the node to manage workloads of the node effectively.

In some examples, computing device 300's additional storage devices, such as the removable storage device 307 and the non-removable storage device 310, may store the logs and monitoring information collected by the software agent. In scenarios where the computing device 300 operates as part of an SOC, the integrated processing units could include specialized security processors dedicated to handling attestation verification and remediation processes.

The term computer readable media as used herein may include computer storage media. Computer storage media may include volatile and nonvolatile, removable and non-removable media implemented in any method or technology for storage of information, such as computer readable instructions, data structures, or program modules. The system memory 304, the removable storage device 307, and the non-removable storage device 310 are all computer storage media examples (e.g., memory storage). Computer storage media may include RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 300. Any such computer storage media may be part of the computing device 300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

Systems and methods of the present disclosure are described. In some examples, the present disclosure includes a method for workload scheduling in an edge computing environment, comprising: accessing, by a software agent implemented by a node, event data for the node; determining an attestation state of the node by comparing the event data to one or more predefined values for the event data, the attestation state representing a trustworthiness of the node; applying a taint to the node based on the attestation state, the taint representing an operational constraint for the node; and managing workloads associated with the node based on the taint, wherein managing the workloads comprises one of: evicting a currently executing workload from the node based on the currently executing workload being incompatible with the taint; or scheduling a new workload to execute on the node based on the new workload being compatible with the taint.

In some examples, the method further comprises applying a first taint to the node based at least in part on the attestation state and the configuration drift of the node.

In some examples, the managing comprises managing the workload on the node based at least in part on the workload associated with a toleration for the first taint applied to the node.

In some examples, the workload is running on the node, and wherein the managing comprises providing an indication to evict the workload from the first node.

In some examples, the managing comprises scheduling the workload to the node.

In some examples, collecting the first data comprises collecting at least one of logs or monitoring information.

In some examples, the method further comprises receiving an attestation indication; and verifying the attestation state of the node based at least in part on the attestation indication.

In some examples, the method further comprises providing instructions to remediate the node based at least in part on the attestation state and the configuration drift of the node.

In some examples, the present disclosure includes a system for workload scheduling in an edge computing environment, comprising: a processor; and memory comprising executable instructions that when executed, perform operations comprising: receiving first data from a plurality of nodes; determining an attestation state for each node based on the received data, wherein the attestation state indicates a security status of a node; calculating a configuration drift for each node, wherein the configuration drift indicates a deviation of the node from a predefined security configuration; applying a first taint to at least one node of the plurality of nodes based on the attestation state and the configuration drift of the at least one node, wherein the first taint represents an operational constraint for a node; scheduling workloads on the plurality of nodes based at least in part on at least one of the attestation state, the configuration drift, or the first taint of the at least one node; and adjusting the scheduling of workloads based at least in part on changes in at least one of the attestation state, the configuration drift, or the first taint of the at least one node.

In some examples, the operations further comprise applying a first taint to the node based at least in part on the attestation state and the configuration drift of the node.

In some examples, the managing comprises managing the workload on the node based at least in part on the workload associated with a toleration for the first taint applied to the node.

In some examples, the workload is running on the node, and wherein the managing comprises providing an indication to evict the workload from the first node.

In some examples, the managing comprises scheduling the workload to the node.

In some examples, collecting the first data comprises collecting at least one of logs or monitoring information.

In some examples, the operations further comprise receiving an attestation indication; and verifying the attestation state of the node based at least in part on the attestation indication.

In some examples, the operations further comprise providing instructions to remediate the node based at least in part on the attestation state and the configuration drift of the node.

In some examples, the present disclosure includes a system for workload scheduling in an edge computing environment, comprising: a processor; and memory comprising executable instructions that when executed, perform operations comprising: accessing, by a software agent implemented by a node, event data for the node; determining an attestation state of the node by comparing the event data to one or more predefined values for the event data, the attestation state representing a trustworthiness of the node; determining a configuration drift of the node, wherein the configuration drift indicates a deviation of the node from a predefined security configuration; applying a taint to the node based on the attestation state and the configuration drift, the taint representing an operational constraint for the node; and based on the taint, performing at least one of: evicting a currently executing workload from the node based on the currently executing workload being incompatible with the taint; or preventing new workloads that are incompatible with the taint from being scheduled to execute on the node.

In some examples, the first controller is further configured to apply a first taint to the node based at least in part on the attestation state, the configuration drift of the node, and a security score of the node.

In some examples, the managing comprises managing the workload on the node based at least in part on the workload associated with a toleration for the first taint applied to the node.

In some examples, the workload is running on the node, and wherein the managing comprises evicting the workload from the first node.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method comprising:

accessing, by a software agent implemented by a node, event data for the node;

determining an attestation state of the node by comparing the event data to one or more predefined values for the event data, the attestation state representing a trustworthiness of the node, wherein determining the attestation state comprises providing, by the software agent, an attestation status report, wherein the software agent determines a security score for the node based on the attestation state and a configuration drift for the node, the security score indicating whether the node is healthy;

applying a taint to the node based on the attestation state, the taint representing an operational constraint for the node; and managing workloads associated with the node based on the taint, wherein managing the workloads comprises one of:

evicting a currently executing workload from the node based on the currently executing workload being incompatible with the taint; or scheduling a new workload to execute on the node based on the new workload being compatible with the taint.

2. The method of claim 1, wherein the currently executing workload is a member of a pod implemented by the node.

3. The method of claim 2, wherein the pod includes a plurality of workloads having at least one of shared storage or shared network resources.

4. The method of claim 1, wherein the one or more predefined values for the event data are defined by at least one security policy stored by the node.

5. The method of claim 4, wherein the software agent and the at least one security policy are provided to the node as part of an initialization process for the node.

6. The method of claim 1, wherein the node is a confidential node that ensure that data and applications implemented within the node remains private.

7. The method of claim 1, wherein the event data is collected from at least one of Trusted Platform Module (TPM) event logs or Platform Configuration Register (PCR) data.

8. The method of claim 1, wherein determining the attestation state of the node comprises obtaining a web token response from an attestation service.

9. A system comprising:

a processor; and memory comprising executable instructions that, when executed, performs operations comprising:

receiving data from a node;

determining, for the node and based on the data, an attestation state indicating a security score of the node, wherein determining the attestation state comprises providing, by a software agent implemented by the node, an attestation status report to a controller based on the web token response;

calculating a configuration drift for the node, wherein the configuration drift indicates a deviation of the node from a predefined security configuration, and wherein the software agent determines the security score based on the attestation state and the configuration drift, the security score indicating whether the node is healthy;

applying a taint to the node based on the attestation state and the configuration drift of the node, wherein the taint represents an operational constraint for the node; and scheduling a workload on the node based on at least one of the attestation state, the configuration drift, or the taint.

10. The system of claim 9, wherein the workload includes a toleration for the taint, the toleration being a property that identifies whether the workload is configured to handle the operational constraint.

11. The system of claim 9, wherein determining the attestation state for the node comprises receiving a web token response from an attestation service.

12. The system of claim 11, wherein the web token response includes the attestation state and the configuration drift.

13. The system of claim 11, wherein the software agent provides the attestation status report to a controller based on the web token response.

14. The system of claim 9, the operations further comprising:

determining that the configuration drift indicates the node is not healthy; and in response to determining that the configuration drift indicates the node is not healthy, remediating the node.

15. The system of claim 14, wherein remediating the node comprises setting a current security configuration of the node to the predefined security configuration.

16. A device comprising:

a processor; and memory comprising executable instructions that, when executed, perform operations comprising:

accessing, by a software agent implemented by a node, event data for the node;

determining an attestation state of the node by comparing the event data to known values for the event data, the attestation state representing a trustworthiness of the node, wherein determining the attestation state comprises providing, by the software agent, an attestation status report;

determining a configuration drift of the node, the configuration drift indicating a deviation of the node from a known security configuration, wherein the software agent determines a security score for the node based on the attestation state and the configuration drift, the security score indicating whether the node is healthy;

applying a taint to the node based on at least one of the attestation state or the configuration drift, the taint representing an operational constraint for the node; and based on the taint, performing at least one of:

evicting a currently executing workload from the node based on the currently executing workload being incompatible with the taint; or preventing new workloads that are incompatible with the taint from being scheduled to execute on the node.

17. The device of claim 16, wherein determining the attestation state comprises evaluating one or more event logs to determine whether the node booted correctly.

18. The device of claim 16, wherein determining the configuration drift comprises identifying whether first values in a current security configuration for the node exceed a threshold difference from second values in the known security configuration.

19. The device of claim 16, wherein the currently executing workload is a member of a pod implemented by the node, the pod including a plurality of workloads having at least one of shared storage or shared network resources.

20. The device of claim 16, wherein the software agent and the at least one security policy are provided to the node as part of an initialization process for the node.

* * * * *